United States Patent [19]

Talmon et al.

[11] Patent Number: 4,577,907

[45] Date of Patent: Mar. 25, 1986

[54] SEAT ASSEMBLY

[75] Inventors: Floyd H. Talmon, Fairview Park, Ohio; David K. Talmon, Williamsville, N.Y.

[73] Assignee: Air-Lock Plastics, Inc., Tonawanda, N.Y.

[21] Appl. No.: 662,501

[22] Filed: Oct. 19, 1984

[51] Int. Cl.$^4$ .............................................. A47C 7/02
[52] U.S. Cl. ............................ 297/452; 297/DIG. 1; 297/DIG. 2; 297/445
[58] Field of Search .......... 297/452, DIG. 1, DIG. 2, 297/445, 440, 454, 455, 456, 450

[56] References Cited

U.S. PATENT DOCUMENTS

| 3,220,007 | 1/1966 | Spangler et al. | 297/450 |
| 3,270,393 | 9/1966 | Levenson | 297/DIG. 2 |
| 3,431,023 | 3/1969 | Anderson | 297/452 |
| 3,482,874 | 12/1969 | Henebry et al. | 297/452 |

FOREIGN PATENT DOCUMENTS

| 10542 | 6/1972 | Japan | 297/DIG. 2 |
| 2029212 | 3/1980 | United Kingdom | 297/DIG. 2 |

Primary Examiner—James T. McCall
Attorney, Agent, or Firm—Christel, Bean & Linihan

[57] ABSTRACT

A seat assembly 10 having as its principal components a generally rigid integral blow molded seat construction 12 having bottom and back portions, and bottom and back cushions 20,22, received within recessed areas 42,44 of the bottom and back portions. The blow molded seat construction is provided with a pair of reinforcing wells 46,48 in each of the bottom and back portions, each well bottom wall being bonded to the corresponding opposed surface 34,38. Mounting plates 18 are disposed within the reinforcing wells 46 of the bottom portion and threaded fasteners 16 are screwed into the mounting plates to secure the blow molded seat construction to a support.

7 Claims, 7 Drawing Figures

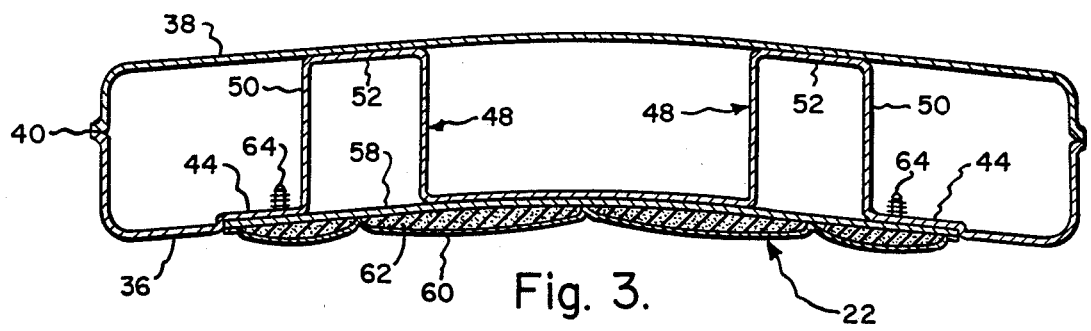
Fig. 3.
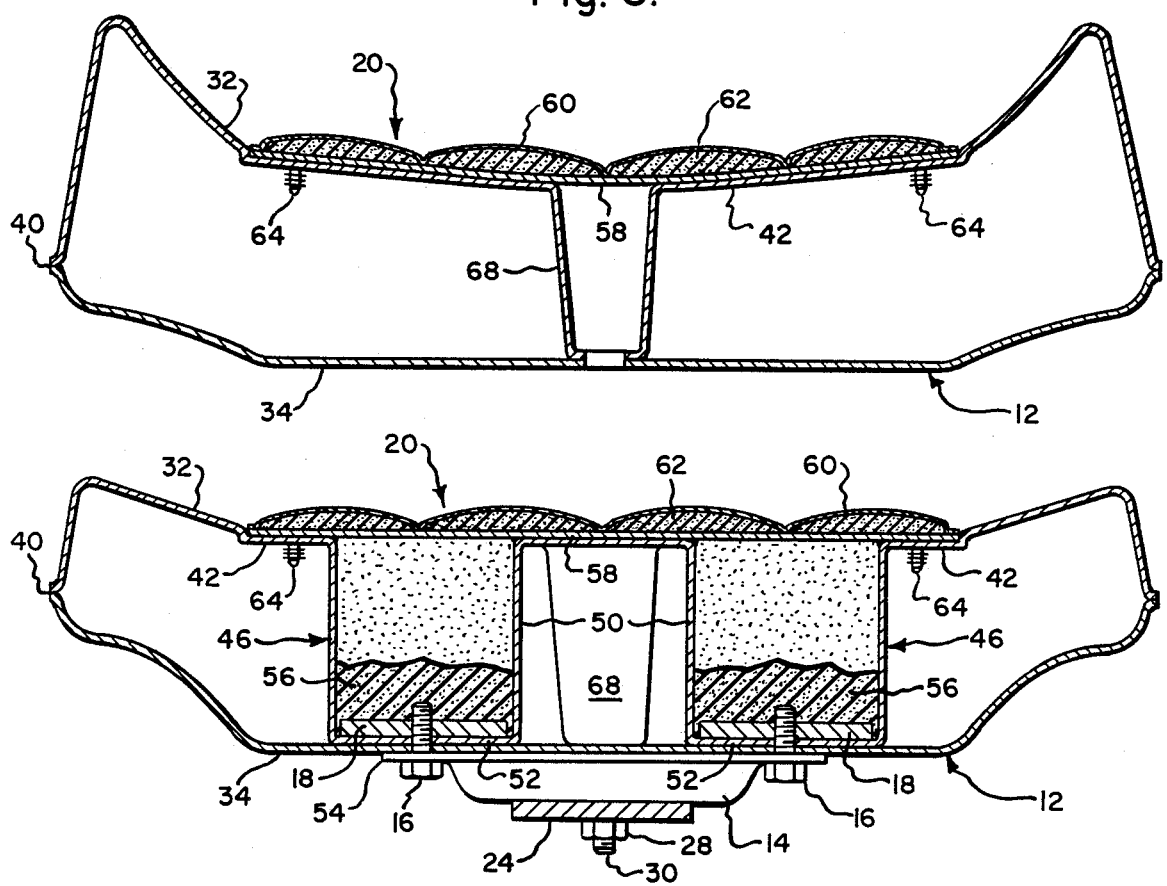
Fig. 5.
Fig. 4.
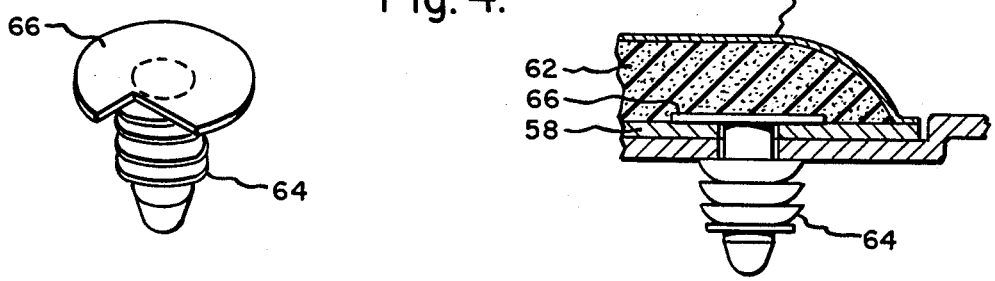
Fig. 6. Fig. 7.

4,577,907

SEAT ASSEMBLY

TECHNICAL FIELD

The present invention relates generally to a seat assembly, and more particularly to a seat assembly which has as its primary elements a blow molded plastic seat construction which is covered by resilient back and bottom cushions.

BACKGROUND

The present invention can find utility as a garden tractor seat or in other related environments where seats are desirable having the same general characteristics of a garden tractor seat. Desirable characteristics of a garden tractor seat are durability, weather resistance, pleasing appearance, reasonable comfort and relatively low cost. Thus, as garden tractors are frequently stored outdoors and are subject to a fair amount of abuse, it is necessary that they be manufactured of relatively durable materials which require only minimal maintenance, such as for example, being capable of being washed off with a garden hose. Additionally, it is necessary that these seats be relatively attractive in order for the tractors utilizing the seat to compete in the marketplace. A reasonable degree of comfort is also desired. Finally, in view of the cost competition which exists within the industry, it is necessary that these seats be of relatively low cost construction.

Prior art constructions typically utilized a stamped steel shell base, waterproof covering of molded, seamless vacuum-formed vinyl, and poured-in-place foam between the base and covering. One such example is the "Suburban" seat manufactured by the Sears Manufacturing Company of Davenport, Iowa. Tractor seats having similar appearances are shown in U.S. Pat. Nos. Des. 192,421, 199,304 and 237,330.

While seats of the above construction have been generally satisfactory, it is possible for the vinyl covering to become punctured and/or torn, necessitating the replacement of the entire seat. In addition, because expensive dies are required to produce the stamped steel shell base, the above construction is relatively expensive when produced in limited volumes when compared to a blow molded plastic seat construction. In addition, it is somewhat difficult to provide seats with more than one color when using the prior art design.

OBJECTS AND SUMMARY OF THE INVENTION

It is an object of the present invention to provide a seat assembly of pleasing appearance, reasonable comfort, relatively low cost and good weather resistance and durability.

It is a further object of the present invention to provide a seat of the character set forth above wherein damaged bottom and back cushions may be readily replaced.

The above objects and other objects and advantages of the present invention are accomplished by providing a support upon which is mounted a generally rigid integral blow molded seat construction. The seat construction in turn receives bottom and back cushions which are readily secured to recessed areas on the blow molded seat construction. The blow molded seat construction is secured to the support by means of mounting plates which are received within reinforcing wells in the bottom portion of the blow molded seat construction, and by threaded fasteners which pass through the support and a portion of the blow molded seat construction and which are screwed into the mounting plates.

The above can be more fully appreciated from a consideration of the following detailed construction taken in conjunction with the accompanying drawings in which a preferred form of this invention is illustrated.

BRIEF DESCRIPTION OF THE DRAWINGS

FIGS. 3, 4 and 5 are further sectional views of the seat assembly shown in FIG. 1, these views being taken generally along the lines 3—3, 4—4 and 5—5 in FIG. 1.

FIG. 6 is an enlarged perspective view of a cushion fastener.

FIG. 7 is an enlarged sectional view showing the manner in which a cushion is secured to a blow molded seat construction.

DETAILED DESCRIPTION

Figure 1:
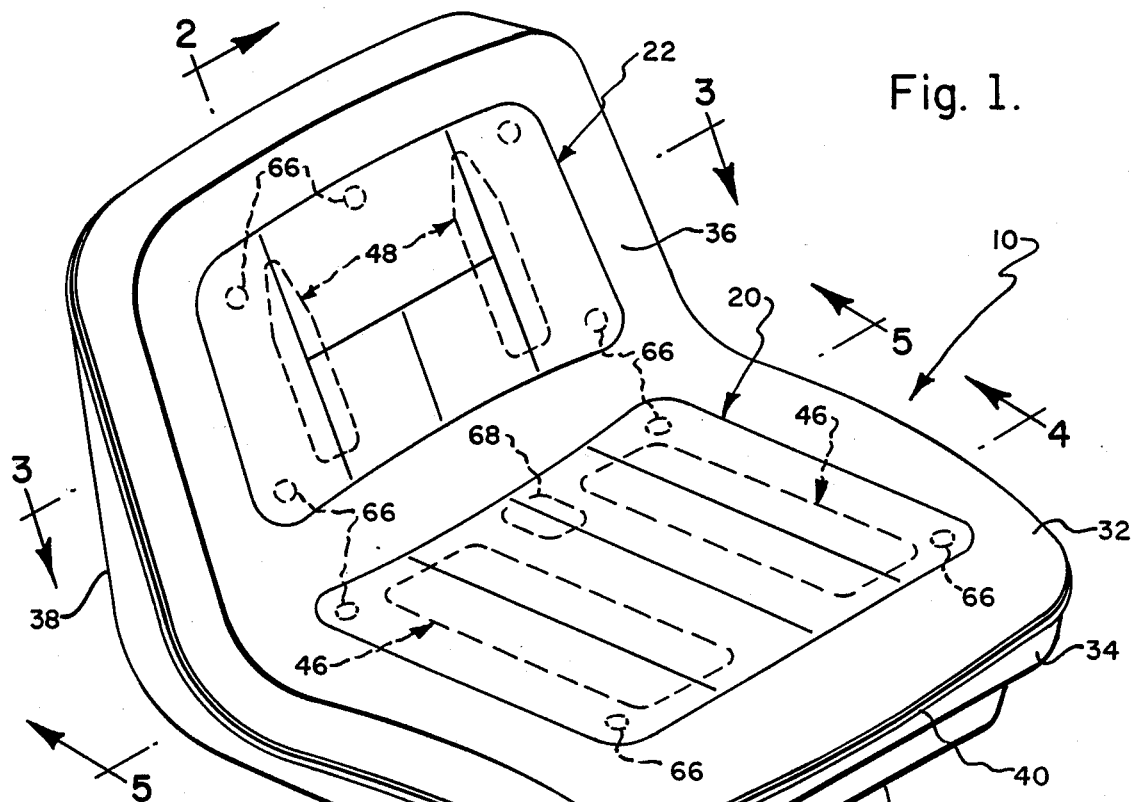
FIG. 1 is a perspective view of the seat assembly of this invention.
Figure 2:
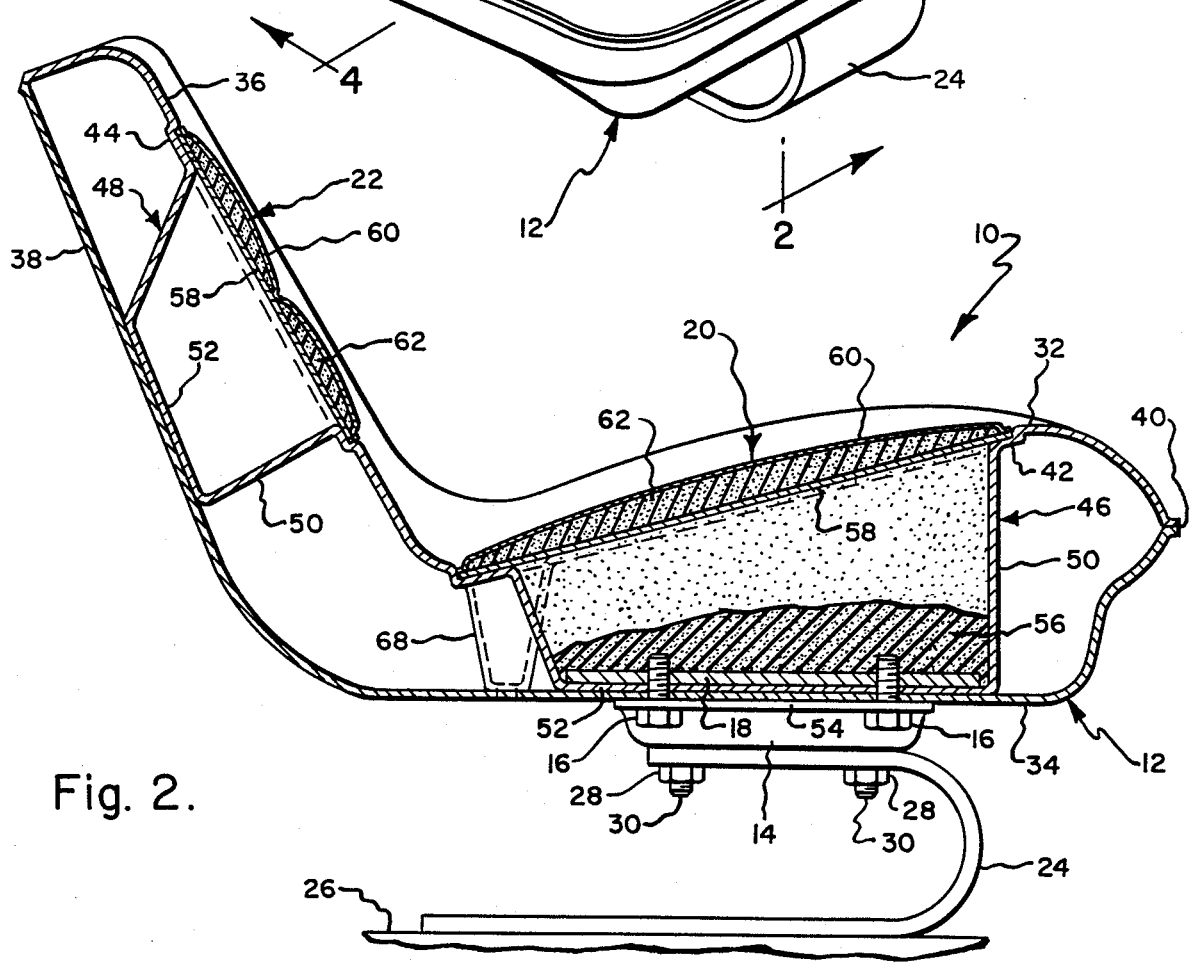
FIG. 2 is a sectional view of the seat assembly shown in FIG. 1, this view being taken generally along the line 2—2 in FIG. 1.

The seat assembly of this invention, which is indicated generally at 10, is formed of a number of major components, the primary ones being a generally rigid blow molded seat construction, indicated generally at 12, the blow molded seat construction, indicated generally at 12, the blow molded seat being secured to a support 14 by means of fastening means 16 which are secured to mounting plates 18. In addition, bottom and back cushions, which are generally indicated at 20,22, respectively, are in turn secured to bottom and back portions of the blow molded seat 12. The seat assembly, described very briefly above, can in turn be secured to a leaf spring 24 mounted upon a base 26 by suitable nuts and bolts 28,30, the bolts passing through suitable apertures in the support 14 and spring 26. Alternatively, the seat assembly can be secured directly to the base 24 in a similar manner.

The blow molded construction includes a bottom portion and a back portion, the bottom portion including a bottom cushion receiving surface 32 and an opposed surface 34. Similarly, the back portion includes a back cushion receiving portion 36 and an opposed portion 38. The cushion receiving surfaces 32 and 36 and the corresponding opposed surfaces 34 and 38 are separated from each other at their marginal edges by a parting line 40. As can be seen from the various figures, the parting line 40 is raised slightly to permit the ready removal of flash from the seat without apparent visual damage from the seat. Each of the bottom and back cushion receiving surfaces is provided with a recessed area, 42,44, respectively, which receives the associated bottom or back cushion. Additionally, each of the recessed areas 42,44 is further provided with a pair of reinforcing wells, wells 46 being associated with the bottom recessed surface 42 and wells 48 being associated with the back recessed surface 44. Each of the wells 46,48 is defined by a plurality of spaced apart sidewalls 50 and an interconnecting well bottom wall 52 which is bonded to the corresponding opposed surface by compression molding when in a thermoplastic state during the formation of the blow molded seat. The sidewalls or standoffs 50 maintain the cushion receiving surfaces and the corresponding opposed surfaces at a substantially fixed distance from each other thereby rendering the blow molded seat construction generally rigid. The bottom reinforcing wells 46 have bottom walls which are generally rectangular.

The mounting plates 18 are received in the bottom of the bottom reinforcing wells 46, and these plates are generally rectangular in shape. One of the plates opposed surfaces lies in the juxtaposition with the well bottom wall 52. The plate is provided with a pair of spaced apart threaded apertures which are adapted to be aligned with corresponding apertures which are formed in the opposed surface 34 and the well bottom wall 52. Threaded fasteners 16 pass through corresponding apertures in a flange 54 of the support 14 and are screwed into the plates 18 to secure the plates 18 and the blow molded seat construction 12 to the support 14. The support 14 is preferably formed of stamped sheet metal, but could be formed of other suitable materials. In order to maintain the plates 18 in the bottom of the wells 46, maintaining means in the form of foam blocks 56 are mounted within the wells 46.

Each of the back and bottom cushions is of the same general construction. To this end, each of the cushions is provided with a backing 58 to which is secured a covering 60. Disposed between the backing the the covering is resilient foam 62. The backing can be formed of a number of materials and it is desirable that it has a limited amount of flexibility and be fairly weather resistant. One suitable material can be a relatively thin plastic board, while another suitable material can be treated fiberboard. The covering 60 is preferably of a vinyl material and is suitably bonded to the backing in a conventional manner with the resilient foam being disposed between the covering and the backing. It is a feature of this invention to provide a construction wherein differing colors may be utilized to increase the eye appeal of the seats. Therefore, for example, the material which forms the blow molded seat construction could be of a black thermoplastic whereas the vinyl material in the seat cushions could be yellow, red, etc. To this end, various color combinations can be achieved to increase the eye appeal of the seat and also to permit the color coordination of the seat with the article with which it is to be associated. The seat cushions can be secured to the seat in a variety of ways. A preferred form of mounting the cushion to the blow molded seat is by the use of fasteners of the type illustrated in FIGS. 6 and 7. These fasteners are formed of plastic and have a plurality of resilient conical rings 64 which give the fastener a somewhat "christmas tree" appearance. Thus, these fasteners are commonly referred to as Christmas tree fasteners. The base end 66 of the fastener is disposed adjacent the foam 62 within the cushion, the base 66 of the fastener passing through suitable apertures in the backing 58. Corresponding apertures are formed in the associated recessed area 42,44 and the cushions can thus readily be assembled to the seat. However, should the cushions become damaged, they can readily be replaced. While "Christmas tree" fasteners have been described above, it should be appreciated that other forms of fasteners could be utilized such as hook and loop pile fasteners of the type sold under the tradename "VELCRO".

As seats of the type illustrated in this invention are frequently stored outside during all sorts of weather, it is desirable that a water drain be provided in the bottom of the seat to prevent the accumulation of water. To this end, therefore, the lower center portion of the seat is depressed and it is associated with a water drain 68 of generally funnel shaped construction. In order to facilitate the operation of the water drain, it should be observed that there is not a tight seal between the backing of the cushion 20 and the associated recessed area 42 and therefore water can drain beneath the cushion and through the water drain.

As techniques for blow molding are well known in the art, the manner in which the seat is blow molded will not be described in detail here.

While a preferred structure in which the principles of the present invention have been incorporated is shown and described above, it is to be understood that this invention is not to be limited to the particular details shown and described above, but that, in fact, widely differing means may be employed in the practice of the broader aspects of this invention.

What is claimed is:

1. A seat assembly comprising:
  a support;
  a generally rigid integral one piece blow molded seat construction having bottom and back portions, the bottom portion having a bottom cushion receiving surface and an opposed surface, and the back portion having a back cushion receiving surface and an opposed surface, each of said cushion receiving surfaces being provided with a recessed area, the recessed area in the bottom portion being provided with a pair of spaced apart reinforcing wells, each well having spaced apart sidewalls and an interconnecting well bottom wall which is bonded to the corresponding opposed surface, said reinforcing wells maintaining the bottom cushion receiving surface at a substantially fixed distance from the corresponding opposed surface;
  bottom and back cushions received within the recessed areas of said bottom and back cushion receiving surfaces, each of said cushions including a backing, a covering, and resilient foam disposed between said backing and said covering, the backing and the recessed area of the associated cushion receiving surface being in juxtaposition;
  a pair of mounting plates received within the pair of reinforcing wells in the bottom portion, one surface of each of said mounting plates and a corresponding well bottom wall being in juxtaposition; and
  fastening means extending through said support, said opposed surface of the bottom portion, a well bottom wall and an associated mounting plate to secure said blow molded seat construction to said support.

2. The seat construction as set forth in claim 1 wherein said fastening means are threaded, and wherein each of said mounting plates is provided with spaced apart threaded apertures which receive said threaded fastening means.

3. The seat assembly as set forth in claim 1 further characterized by the provision of maintaining means capable of maintaining the pair of mounting plates in juxtaposition with said corresponding well bottom wall.

4. The seat construction as set forth in claim 3 wherein said maintaining means is a foam block compressed between an associated mounting plate and the backing of the bottom cushion.

5. The seat assembly as set forth in claim 1 wherein said cushions are secured to the cushion receiving surfaces by cushion fasteners which are normally carried by said cushions, the recessed area of said cushion receiving surfaces being provided with a plurality of apertures which receive said fasteners.

6. The seat assembly as set forth in claim 1 wherein said blow molded seat construction is provided with a funnel-shaped water drain, the enlarged portion of the funnel-shaped water drain being disposed adjacent the rear of the recessed area of the bottom cushion.

7. The seat assembly as set forth in claim 1 wherein the cushion receiving surfaces and the corresponding opposed surfaces are separated from each other at their marginal edges by a parting line.

* * * * *